United States Patent [19]

Obara

[11] Patent Number: 4,577,090
[45] Date of Patent: Mar. 18, 1986

[54] PRIMARY CABLE APPARATUS FOR ROBOT WELDING GUN

[75] Inventor: Hiroshi Obara, Tokyo, Japan

[73] Assignee: Obara Corporation, Tokyo, Japan

[21] Appl. No.: 526,450

[22] Filed: Aug. 24, 1983

[30] Foreign Application Priority Data

Aug. 27, 1982 [JP] Japan .................... 57-128529[U]

[51] Int. Cl.$^4$ .............................................. B23K 11/36
[52] U.S. Cl. .................................. 219/137.9; 361/42
[58] Field of Search .......... 219/137.9; 361/42, 47–50; 339/149 P, 150 B, 150 C, 151 B, 156 R, 151 C

[56] References Cited

U.S. PATENT DOCUMENTS

| | | | |
|---|---|---|---|
| 2,605,314 | 7/1952 | Schelke | 339/150 B |
| 3,602,772 | 8/1971 | Hundhausen et al. | 361/50 |
| 3,891,894 | 6/1975 | Scarpino | 361/48 |
| 4,403,267 | 9/1983 | Verhoff et al. | 361/42 |
| 4,423,306 | 12/1983 | Fox | 219/137.9 |

Primary Examiner—C. L. Albritton
Assistant Examiner—Catherine M. Sigda
Attorney, Agent, or Firm—Birch, Stewart, Kolasch & Birch

[57] ABSTRACT

A primary cable apparatus for a robot welding gun having a cable including a pair of conductors operatively connected to a welding power source, a grounding conductor, a shield wire surrounding the pair of conductors and the grounding conductor and an insulation coating operatively positioned around the shield wire. A first connector is operatively mounted on one end of the cable for connection to the welding power source and includes terminals connected to the conductors. A second connector is provided for detecting a disorder having a terminal operatively connected to the grounding conductor and a terminal connected to the shield wire for detecting damage to the insulation coating of the cable. A disorder detector is operatively connected to the terminals of the second connector and includes a circuit breaker interposed in a welding power circuit which is responsive to an output of the disorder detector.

4 Claims, 5 Drawing Figures

PRIMARY CABLE APPARATUS FOR ROBOT WELDING GUN

BACKGROUND OF THE INVENTION

1. Field of the Invention

This invention relates to a primary cable apparatus for a robot welding gun having a transformer.

2. Description of Background Art

Hithertofore, a cable for a robot welding gun was known which included a pair of conductors for a welding power source and a pair of conductors for a valve control power source. The cable was utilized for connecting a robot welding gun having a transformer to a robot controller. When this type of cable is continually used in an unmanned factory, it is usual that even after an insulation coating for the cable is damaged, the cable is still continued to be used with its damaged portion remaining unchecked. As a result, a problem may occur when the conductors thereof contact an external object, such as a workpiece, a jig or the like, on the grounding side and an excessive current flows therethrough. The grounding of the cable may cause injury to an individual or a fire or the like.

SUMMARY AND OBJECTS OF THE INVENTION

This invention has for its object to provide a cable apparatus free from the inconveniences of the prior art. The cable includes a pair of conductors for a welding power source, a grounding conductor, a shield wire surrounding the conductors and an insulation coating provided around the shield wire at one end thereof. A connector for the welding power source includes terminals connected to the conductors and a second connector for detecting a disorder includes a terminal connected to the grounding conductor and a terminal connected to the shield wire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
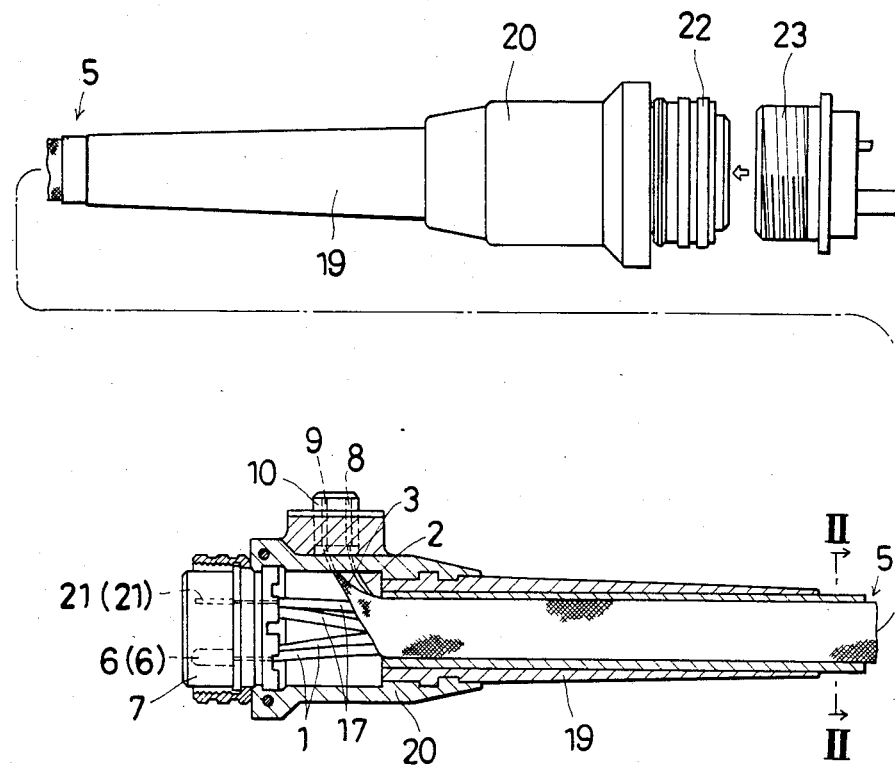
FIG. 1 is a side view, partly in section, of one example of the present invention.
Figure 2:
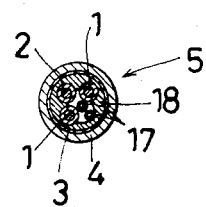
FIG. 2 is a sectional view taken along the line II—II in FIG. 1.

FIGS. 1 and 2 illustrate one example of the present invention. The cable apparatus includes a cable 5 having a pair of insulation-coated conductors 1, 1 for a welding power source, a pair of insulation-coated conductors 17, 17 for a valve control power source and an insulation-coated grounding conductor 2. A shield wire 3, for example, of metallic tubular gauze network, surrounds the conductors 1, 1, 2 and 17, 17 through an insulation material 18. An insulation coating 4 is applied to the outer peripheral surface of the shield wire 3.

The cable 5 is provided at its electric power side end portion with a protection tube 19 and a fastening member 20 for fastening the protection tube 19. A connector 7 is attached to the fastening member 20. The connector 7 may be connected to a welding power source having terminals 6, 6 connected to the conductors 1, 1 and terminals 21, 21 connected to the conductors 17, 17. A connector 10, which is used for disorder detecting, includes a terminal 8 connected to the grounding conductor 2 and a terminal 9 connected to the shield wire 3. The connectors 7 and 10 may be, for example, of the plug type. The cable 5 is also provided at its robot welding gun side end portion with another protection tube 19 and another fastening member 20 similarly to the one as described above. A plug 22 is attached to the fastening member 20. A receptacle 23 may be attached to a casing or the like of a transformer 28.

Figure 3:
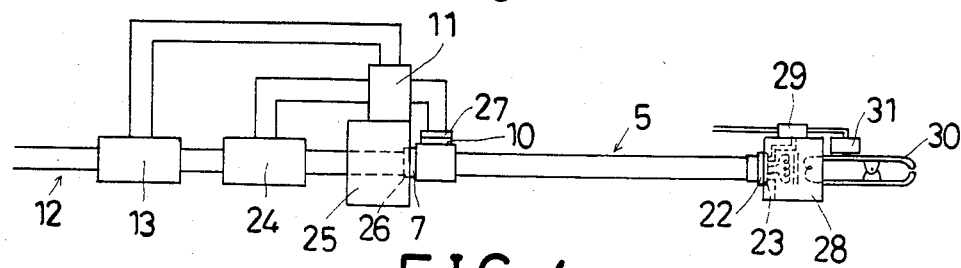
FIG. 3 is a diagrammatical side view of the same in its connected condition.

Referring to FIG. 3, a diagrammatical view of the cable apparatus of the present invention is illustrated in its connected condition. A circuit breaker 13 including, for example, a high-speed electric leakage breaker is interposed in a welding power circuit 12 and is connected to the pair of conductors 1, 1 of the cable 5 through a timer contacter 24 for the welding gun controller and a robot controller 25. For facilitating this connection, a receptacle 26, adapted to be connected to the plug constituting the welding power source connector 7 of the cable 5, is provided on the robot controller 25. Terminals of the receptacle 26, adapted to be connected to the terminals 21, 21 of the connector 7, are connected to a valve control circuit in the robot controller 25, though not illustrated.

A disorder detector 11 is positioned to be supplied with a power source voltage from a secondary side of a transformer provided on the timer contacter 24. An input side thereof is connected to the grounding conductor 2 and the shield wire 3 of the cable 5 through a connector 27 and the connector 10. An output side thereof is connected to the circuit breaker 13. The said timer contacter 24 is omissible. The robot welding gun side end portion thereof is connected, through the plug 22 provided thereon, to a receptacle 23 provided on the transformer 28, so that the conductors 1, 1 are connected to the primary winding of the transformer 28. The conductors 17, 17 for the valve control power source are connected to a valve 29 provided near the transformer 28. The grounding conductor 9 is connected to a jig holding a workpiece or the like on the ground side, although not illustrated in the drawings. The valve 29 is connected on its one side to a pressure air source and on its other side to an air cylinder 31 for driving a gun 30, through respective air passages.

Figure 4:
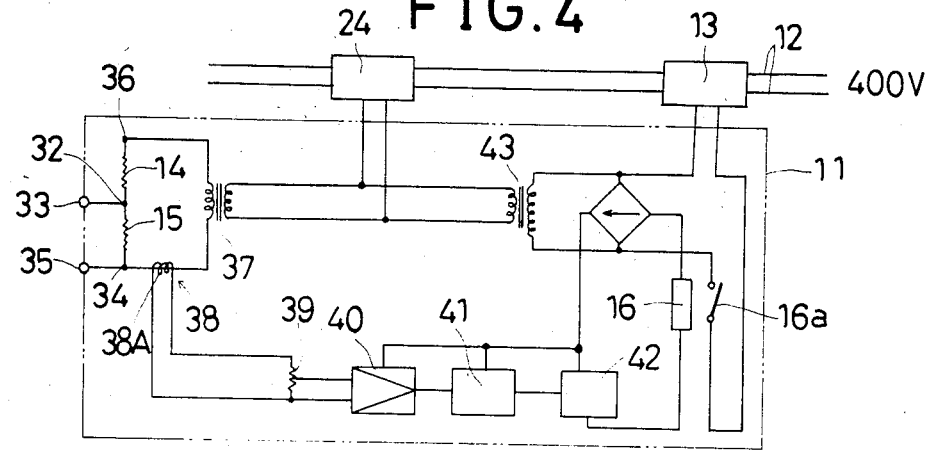
FIG. 4 is an electric circuit diagram of one example of a disorder detector thereof.

FIG. 4 is an electric circuit diagram of one example of the disorder detector 11. In this example, the disorder detector 11 comprises two series-connected resistors 14, 15 which are connected at their intermediate connecting point 32 and at either one end of the resistors 14, 15, for instance, at one end 34 thereof to a terminal 33 connected to the grounding conductor 2 and a terminal 35 connected to the shield wire 3, respectively. The resistors 14, 15 are also connected at both ends 34 and 36 to a secondary coil of a transformer 37. A relay 16 is arranged to be operated by a change of an electric current flowing through a circuit extending from the one end 34 or the other end 36 to the secondary coil of the transformer 37 so as to operate the circuit breaker 13 by an output thereof.

In more detail, the circuit connected between the one end 34, for instance, of the series-connected resistors 14, 15 and the secondary coil of the transformer 37 is provided with a current transformer 38 interposed therein. A secondary coil 38A thereof is connected to the relay 16 through a potentiometer 39, an amplifier 40, a Schmidt circuit 41 and a switching circuit 42. When the shield wire 3, as a result of damage to the insulation coating 4, happens to come into contact with the jig member, for instance, on the grounding side, a secondary electric current of the current transformer 38 is increased, amplified and wave-formed. The wave-formed output serves to operate the relay 16 through the switching circuit 42.

The operation of the foregoing example will be explained as follows. If, during use of the cable apparatus, the insulation coating 4 of the cable 5 is damaged to uncover the shield wire 3, and the exposed shield wire 3 happens to come into contact with the jig member or the like on the grounding side, the shield wire 3 becomes the earth potential, so that both ends 34, 32 of the resistor 15 of the disorder detector 11 connected through the terminals 33, 35 to the shield wire 3 and the grounding side jig member are short-circuited. Thus, the electric current flowing through the line of the circuit between the resistor 15 to the transformer 37 is increased. The increased current is amplified and wave-formed by the way that the same flows from the current transformer 38 through the amplifier 40 and the Schmidt circuit 41. The switching circuit 42 is then operated by the wave-formed output thereof, and thereby the relay 16 is operated to close a contact 16a. As a result, a trip coil of the circuit breaker 41 is connected to the secondary coil of the transformer 43, so that the circuit breaker 13 is operated and thereby the welding power circuit 12 is cut-off. The operator is thus provided with notification that the cable 5 is damaged.

When the shield wire 3 of the cable 5 comes into contact with the conductor 1 or the conductor 17, a voltage applied between both ends of the resistor 15 is increased. Consequently, the secondary current of the current transformer 38 is increased. Thus, the circuit breaker 13 is operated and thereby the welding power circuit 12 is cut off.

Figure 5:
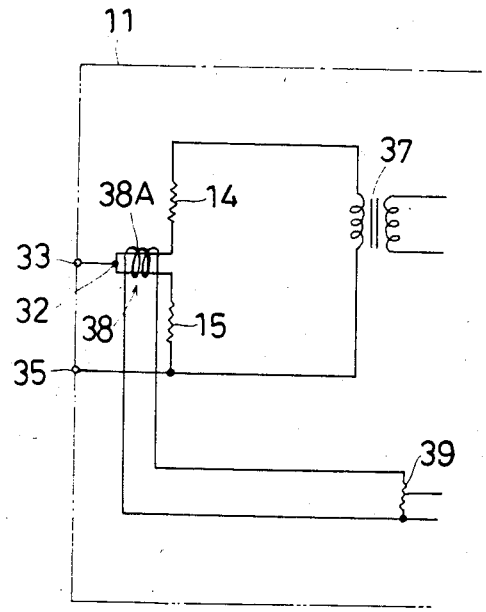
FIG. 5 is an electric circuit diagram of an important portion of a modified detector thereof.

FIG. 5 is an electric circuit diagram of the input portion of a modified example of the disorder detector 11. In this modified example, the secondary coil 38A of the current transformer 38 is provided on a connecting circuit between the resistor 14 and the intermediate connecting point 32 and a connecting circuit between the resistor 15 and the intermediate connecting point 32 so as to extend across them magnetically. By the electric currents flowing through the respective resistors 14, 15 in an ordinary condition of the cable, no electric current flows through the secondary coil 38A. If the exposed shield wire 3 and the grounding side jig member, for instance, come into contact one with another, so that a difference is caused between the amount of electric current flowing through the respective circuits of the respective resistors 14, 15 consequently, a secondary current flows through the secondary coil 38A. The remaining circuit arrangement after the potentiometer 39 is not different from that in the example of FIG. 4.

Accordingly, when the naked shield wire 3 comes into contact with the grounding side jig member or the like, the disorder of the cable 5 can be detected by the foregoing secondary current in almost the same manner as in the case of the circuit shown in FIG. 4.

Thus, according to the present invention, a cable 5 comprising a pair of conductors 1, 1 for a welding power source, a grounding conductor 2 and a shield wire 3 surrounding the conductors 1, 1 and 2. An insulation coating 4 around the shield wire 3 is provided on one end portion thereof with a welding power source connector 7 having terminals 6, 6 connected to the conductors 1, 1, and a disorder detecting connector 10 having terminals 8 and 9 connected, respectively, to the grounding conductor 2 and the shield wire 3. When there is something wrong with the cable 5, a disorder signal can be detected through the connector 10, and the foregoing inconvenience involved in the conventional cable apparatus can be eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A primary cable apparatus for a robot welding gun having a cable comprising:
   a pair of conductors operatively connected to a welding power source;
   a grounding conductor;
   a shield wire positioned to substantially surround the pair of conductors and the grounding conductor;
   an insulation coating operatively positioned to substantially surround the shield wire;
   a first connector operatively mounted on one end of the cable for connection to the welding power source and including terminals connected to the conductors;
   a second connector for detecting a disorder having a terminal operatively connected to the grounding conductor and a terminal connected to the shield wire for detecting damage to the insulation coating of the cable; and
   a disorder detector operatively connected to the terminals of the second connector by two input terminals which are thus connected to said grounding conductor and said shield wire respectively; and
   circuit means connected to said input terminals and responsive to said two input terminals being at an equal potential for operating a circuit breaker interposed in a welding power circuit.

2. The primary cable apparatus according to claim 1, wherein said circuit means comprises two series-connected resistors operatively connected together at an intermediate connecting point, the intermediate connection point and an end of the two series-connected resistors are operatively connected to the grounding conductor and the shield wire by said input terminals, respectively, and at both ends to a power source, a relay is operatively connected to the two series-connected resistors to be responsive to a change of an electric current flowing through a circuit connecting between the two series-connected resistors and the power source so as to actuate the circuit breaker.

3. The primary cable apparatus according to claim 2, wherein the relay is operatively connected to the two series-connected resistors to be responsive to a change in an electric current flowing through part of the circuit extending from one end or the other end of the two series-connected resistors to the power source.

4. The primary cable according to claim 2, wherein the relay is operatively connected to the two series-connected resistors to be responsive when there is caused a difference in the amount of electric currents flowing, respectively, through the two resistors.

* * * * *